United States Patent [19]
Bassett et al.

[11] Patent Number: 5,832,747
[45] Date of Patent: Nov. 10, 1998

[54] CRYOGENIC ADJUSTMENT OF HYDROGEN AND CARBON MONOXIDE CONTENT OF SYNGAS

[75] Inventors: John Dollin Bassett, Surbiton; Brian Alfred McNeil, Chessington; Eric William Scharpf, Walton-on-Thames, all of England

[73] Assignee: Air Products and Chemicals, Inc., Allentown, Pa.

[21] Appl. No.: 909,908

[22] Filed: Aug. 12, 1997

[51] Int. Cl.[6] .................................................. F25J 1/00
[52] U.S. Cl. .................................. 62/630; 62/920; 62/931
[58] Field of Search ............................. 62/630, 920, 931

[56] References Cited

U.S. PATENT DOCUMENTS

| | | | |
|---|---|---|---|
| 4,217,759 | 8/1980 | Shenoy | 62/920 |
| 4,488,890 | 12/1984 | Foerg et al. | 62/17 |
| 4,525,187 | 6/1985 | Woodward et al. | 62/31 |
| 4,566,886 | 1/1986 | Fabian et al. | 62/920 |
| 5,351,491 | 10/1994 | Fabian | 62/920 |
| 5,609,040 | 3/1997 | Billy et al. | 62/622 |

*Primary Examiner*—Ronald C. Capossela
*Attorney, Agent, or Firm*—Geoffrey L. Chase

[57] ABSTRACT

The molar ratio of hydrogen and carbon monoxide in synthesis gas is changed by partially condensing at least a portion of the feed gas and separating the partially condensed feed mixture by non-fractionating phase separation. Preferably, the partially condensed feed mixture is separated by a first phase separation into a first liquid stream and a first vapor stream; the first vapor stream is partially condensed and separated by a second phase separation into a second liquid stream and a second vapor stream; the second vapor stream is warmed and expanded to provide refrigeration and partial condensation; and the expanded partially condensed stream is separated by a third phase separation to provide a third liquid stream and a third vapor stream. The synthesis gas product is at least partially derived from the third liquid stream and a portion of the third vapor stream.

27 Claims, 2 Drawing Sheets

CRYOGENIC ADJUSTMENT OF HYDROGEN AND CARBON MONOXIDE CONTENT OF SYNGAS

TECHNICAL FIELD OF THE INVENTION

The present invention relates to the preparation of a gaseous mixture containing a desired molar ratio of hydrogen and carbon monoxide from a gaseous feed containing them in a different molar ratio. It has particular, but not exclusive, application to the provision of syngas containing hydrogen and carbon monoxide in a molar ratio of, for example, 1:1.

BACKGROUND OF THE INVENTION

Syngas is a gaseous mixture consisting essentially of hydrogen and carbon monoxide which, depending upon the level of purity, can contain small amounts of argon, nitrogen, methane and other trace hydrocarbon impurities. Usually, it is obtained by catalytic conversion or partial oxidation of coal, coke, natural gas, or other hydrocarbon feeds. The primary uses of syngas are in the synthesis of methanol (requiring hydrogen:carbon monoxide molar ratio of 2:1) and in reactions to produce oxo-alcohols (requiring hydrogen:carbon monoxide molar ratio of at least 1:1). For many of these applications, it is necessary to control the relative proportions of hydrogen and carbon monoxide. Typically, this is achieved by cryogenically separating crude syngas into hydrogen-rich and carbon monoxide-rich product streams and then combining them in the appropriate ratio to produce the required syngas composition. The level of impurities, especially methane and other hydrocarbons, in the crude syngas usually also is reduced during the cryogenic separation.

It has been proposed to produce syngas of required composition by providing the composition as overhead from a separation column or dephlegmator.

In particular, U.S. Pat. No. 4,488,890 discloses a process in which a syngas product for methanol production is removed as overhead from a scrubbing column fed with partially condensed crude syngas. The column is refluxed with a recycle heat pump stream of liquid carbon monoxide to remove methane from gaseous feed ascending the column. The use of liquid carbon monoxide reflux maintains the carbon monoxide content of the crude syngas feed so that the hydrogen:carbon monoxide molar ratio is 2:1 to 2.6:1 in both the crude and scrubbed gases. In the only exemplified process, said molar ratio of the crude and product syngas is 2.45:1 and 2.55:1 respectively and the methane content of the crude and product syngas is 16.1 mol-% and 0.1 mol-% respectively.

Although the syngas product of the process of U.S. Pat. No. 4,488,890 is directly generated at cryogenic temperature, it is drawn from a full separation column. This limits the pressure at which the syngas can be generated because it is difficult to operate the column at pressures above 25–30 Bara (2.5–3 MPaa). Further, the use of liquid carbon monoxide to reflux the column limits the extent to which the syngas composition can be controlled and involves significant additional capital expenditure and power consumption.

U.S. Pat. No. 4,525,187 discloses a process in which a high pressure syngas product is removed as overhead from a high pressure dephlegmator in which methane is condensed and rectified from the vapor of partially condensed crude syngas. A low pressure syngas product also is provided as overhead from a low pressure dephlegmator which condenses and rectifies methane from the overhead of a splitter column in which carbon monoxide and methane are separated. In the two exemplified processes, the hydrogen:carbon monoxide molar ratio in the crude syngas, high pressure syngas product and low pressure syngas product is 1.9:1, 2.5:1 and 1:10.7 respectively (Example 1) or 2.1:1, 3.3:1 and 1:4.4 respectively (Example 2). The methane content of said exemplified crude syngas, high pressure syngas product and low pressure syngas product is 17.0 mol-%, 0.5 mol-% and 0.65 mol-% respectively (Example 1) or 11.8 mol-%, 0.5 mol-% and 0.65 mol-% respectively (Example 2).

Although the syngas products of the process of U.S. Pat. No. 4,525,187 are directly generated at cryogenic temperatures, dephlegmators are relatively complicated and expensive. The high pressure syngas product necessarily has a significantly higher hydrogen content than the crude syngas and the low pressure syngas necessarily has a much lower hydrogen content than the crude syngas.

It is an object of the present invention to reduce the power consumption and/or capital cost of providing a syngas of required composition by cryogenic treatment of crude syngas.

SUMMARY OF THE INVENTION

It has been found that the production of syngas of required composition can be simply and directly integrated in the cold box of cryogenic separation of crude syngas by use of non-fractionating separation of the partially condensed crude syngas feed. Compared with the prior art processes in which the required syngas composition is produced in the cold box (see U.S. Pat. No. 4,488,890 and U.S. Pat. No. 4,525,187), this reduces the need for refrigeration and separation compression without additional complicated equipment in the cold box. Further, the process of the invention can readily be adapted to provide any commonly used syngas hydrogen:carbon monoxide molar ratio or even multiple syngas compositions and can be applied to both condensation and methane wash cycles. When using a methane wash cycle, the syngas product will have a relatively high methane content unless the methane is first separated within the cold box from the feed to the syngas generation separator. However, some downstream processing for the syngas product will tolerate the methane levels resultant from use of a methane wash cycle without such separation.

Thus, according to a first general aspect, the present invention provides, in a process for changing the composition of a gaseous feed mixture containing hydrogen and carbon monoxide in a first molar ratio of hydrogen to carbon monoxide by cryogenic separation of components thereof to provide a gaseous product containing hydrogen and carbon monoxide at a second hydrogen:carbon monoxide molar ratio, the improvement consisting in that at least a portion of said gaseous feed mixture is partially condensed and the partially condensed feed mixture is separated by non-fractionating phase separation to provide said gaseous product.

In accordance with a second general aspect, the present invention provides, in an apparatus for changing the composition of a gaseous feed mixture containing hydrogen and carbon monoxide in a first molar ratio of hydrogen to carbon monoxide by cryogenic separation of components thereof to provide a gaseous product containing hydrogen and carbon monoxide at a second hydrogen:carbon monoxide molar ratio, the improvement consisting in that the apparatus comprises feed mixture heat exchange means for partially condensing at least a portion of said gaseous feed mixture and non-fractionating phase separation means for separating the partially condensed feed mixture to provide said gaseous product.

DETAILED DESCRIPTION OF THE INVENTION

Figure 1:
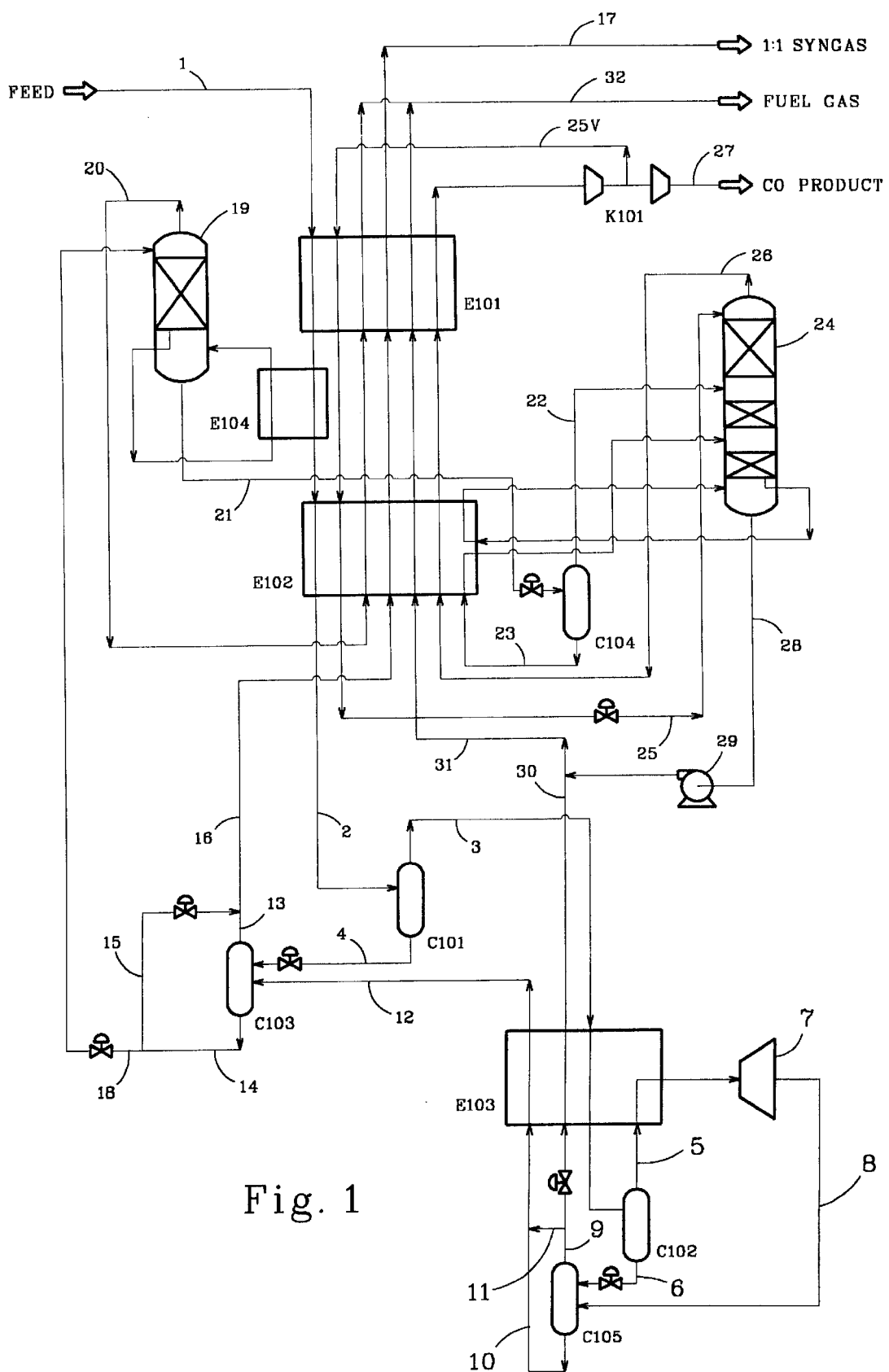
FIG. 1 is a schematic representation of one embodiment of the present invention for producing a gaseous product consisting essentially of hydrogen and carbon monoxide in a hydrogen:carbon monoxide molar ratio of 1:1 from a gaseous feed mixture containing a higher proportion of carbon monoxide and contaminated with methane.

The present invention provides an improvement in a process for changing the composition of a gaseous feed mixture containing hydrogen and carbon monoxide in a first molar ratio of hydrogen to carbon monoxide by cryogenic separation of components thereof to provide a gaseous product containing hydrogen and carbon monoxide at a second hydrogen:carbon monoxide molar ratio. The improvement is that at least a portion of said gaseous feed mixture is partially condensed and the partially condensed feed mixture is separated by non-fractionating phase separation to provide said gaseous product.

The present invention correspondingly provides an improvement in an apparatus for changing the composition of a gaseous feed mixture containing hydrogen and carbon monoxide in a first molar ratio of hydrogen to carbon monoxide by cryogenic separation of components thereof to provide a gaseous product containing hydrogen and carbon monoxide at a second hydrogen:carbon monoxide molar ratio. The improvement is that the apparatus comprises feed mixture heat exchange means for partially condensing at least a portion of said gaseous feed mixture and non-fractionating phase separation means for separating the partially condensed feed mixture to provide said gaseous product.

Usually the process of the invention will comprise the steps of:

partially condensing at least a portion of said gaseous feed mixture containing hydrogen and carbon monoxide in a first molar ratio of hydrogen to carbon monoxide;

separating the partially condensed feed mixture by non-fractionating phase separation to provide a gaseous product stream, containing hydrogen and carbon monoxide at a different hydrogen:carbon monoxide molar ratio, and a carbon monoxide-rich process stream; and warming said gaseous product stream without further cryogenic separation thereof.

Correspondingly, the apparatus of the invention usually will comprise:

feed mixture heat exchange means for partially condensing at least a portion of said gaseous feed mixture;

non-fractionating phase separation means for separating the partially condensed feed mixture to provide a gaseous product stream, containing hydrogen and carbon monoxide at a different molar ratio of hydrogen to carbon monoxide, and a carbon monoxide-rich process stream;

process stream conduit means for removing said carbon monoxide-rich process stream from said phase separation means;

product stream conduit means for removing said gaseous product stream from said phase separation means;

product stream heat exchange means connected to said product stream conduit means for receiving and warming said gaseous product stream without further cryogenic separation thereof.

The partial condensation can be conducted in one or more stages. Preferably, the partially condensed feed mixture is separated by first non-fractionating phase separation into a first liquid stream and a first vapor stream, which vapor stream is partially condensed and separated by second non-fractionating phase separation into a second liquid stream and a second vapor stream. In such an embodiment, the carbon monoxide-rich process stream is at least partially derived from the first liquid stream and the gaseous product stream is at least partially derived from at least one of the second liquid and vapor streams.

The second vapor stream suitably is warmed and expanded to provide refrigeration and, preferably, partial condensation. This expanded, preferably partially condensed, stream together with the second liquid stream is separated by third non-fractionating phase separation to provide a third vapor stream, from which the gaseous product stream is at least partially derived, and a third liquid stream.

In one embodiment, the third liquid stream is mixed with a portion of the third vapor stream and partially vaporized to provide a vaporized portion, from which the gaseous product stream is at least partially derived, and a non-vaporized portion, from which the carbon monoxide-rich process stream is at least partially derived. Preferably, the partially vaporized mixture of the third liquid stream and a portion of the third vapor stream is separated by fourth non-fractionating phase separation to provide a fourth liquid stream and a fourth vapor stream. The gaseous product stream is at least partially derived from said fourth vapor stream and the carbon monoxide-rich process stream is at least partially derived from said fourth liquid stream. A portion of said fourth liquid stream can be added to the fourth vapor stream. Usually, the first liquid stream is reduced in pressure and added to said partially vaporized mixture for said fourth phase separation.

In another embodiment, the third liquid stream is mixed with a portion of the third vapor stream and the mixture is completely vaporized to provide at least part of said gaseous product stream.

Refrigeration can be provided by an independent refrigeration source, for example liquid nitrogen, instead of, or in addition to, expanding the warmed vapor stream.

Usually, hydrogen will be stripped from the carbon monoxide-rich process stream to provide a hydrogen-enriched vapor and a carbon monoxide-enriched liquid. The hydrogen-enriched vapor can be warmed and added to the warmed gaseous product stream to increase the volume thereof. When it is desired to reduce the methane content in a carbon monoxide coproduct, the carbon monoxide-enriched liquid can be separated into a carbon monoxide-rich vapor stream and a methane-enriched liquid stream. The carbon monoxide-rich vapor stream conveniently can provide a recycle heat pump stream to drive this additional purification step.

Optionally, at least part of the third vapor stream can be further processed to provide a hydrogen product by, for example, warming to ambient temperature and purifying in a pressure swing adsorption system.

As mentioned previously, the present application has particular application to the treatment of syngas. However, it can be used to treat other gases containing hydrogen and carbon monoxide.

The following is a description, by way of example only and with reference to the accompanying drawings, of presently preferred embodiments of the present invention.

Referring first to FIG. 1, crude syngas is supplied at, for example, 60 Barg (6 MPag) and 27° C. to a hydrogen/carbon monoxide ("HYCO") cold box via supply conduit 1. The crude gas has been preprocessed in conventional manner to remove water vapor and acid gases such as carbon dioxide, hydrogen sulfide and other sulfur-containing species and contains essentially hydrogen and carbon monoxide contaminated with argon, nitrogen, methane and other trace hydrocarbon impurities.

The feed stream 1 is cooled and partially condensed by passage through heat exchangers E101, E104 and E102. The partially condensed feed 2 is fed to first phase separator pot C101 to provide a first vapor stream 3 and first liquid stream 4. The first vapor stream 3 is further cooled and partially condensed in heat exchanger E103 and fed to second phase separator pot C102 in which is it separated into a second vapor stream 5 and a second liquid stream 6.

The second vapor stream 5 is reheated in heat exchanger E103 and expanded in expander 7 to provide refrigeration for the cold box. The expanded and, usually, partially condensed, stream 8 is fed to third phase separator pot C105, into which the second liquid stream 6 also is flashed. Third vapor stream 9 and third liquid stream 10 are withdrawn from the third phase separator pot C105. A portion 11 of the third vapor stream 9 is added to the third liquid stream 10 and the mixture warmed in heat exchanger E103 to provide a partially vaporized stream 12, which is fed to fourth phase separator pot C103. The first liquid stream 4 also is flashed into the separator C103. Fourth vapor stream 13 at, for example, 35 Barg (3.5 MPag) and fourth liquid stream 14 are withdrawn from the separator C103. Optionally, a portion 15 of the fourth liquid stream 14 is added to the fourth vapor stream 13 to increase the carbon monoxide content thereof. The combined stream 16 is warmed in heat exchangers E102 and E101 for delivery as syngas product 17.

The remainder 18 of the fourth liquid stream 14 is flashed into hydrogen stripping column 19 to provide a hydrogen-enriched vapor overhead 20 and carbon monoxide-enriched liquid bottoms 21. The column 19 operates at, for example, 25 Barg (2.5 MPag) and typically is reboiled against cooling crude syngas feed 1 in heat exchanger E104.

The liquid bottoms 21 are flashed into phase separator C104 from which vapor and liquid streams 22 and 23 respectively are withdrawn. The vapor stream 22 is fed directly to an intermediate location of methane separation column 24. The liquid stream 23 is vaporized in heat exchanger E102 and fed to a lower intermediate location of the column 24. The column 24 is refluxed by carbon monoxide heat pump stream 25 and reboiled in heat exchanger E102 against the crude syngas feed 1 and the heat pump stream 25.

Carbon monoxide overhead 26 from column 24 is warmed in heat exchangers E102 and E101 and compressed in compressor K101. The carbon monoxide heat pump vapor stream 25v is withdrawn from an intermediate stage of the compressor K101 and a carbon monoxide product 27 is withdrawn from the final stage of the compressor K101.

The methane-enriched liquid bottoms 28 from the column 24 is pumped by pump 29 and mixed with the portion 30 of the third vapor stream 9 remaining after removal of portion 11 therefrom. The resultant combined stream 31 is warmed in heat exchangers E102 and E101 and combined with warmed overhead 20 from the hydrogen column 19 to provide fuel gas product 32 at, for example, 24 Barg (2.4 MPag) and which conveniently is delivered to a gas turbine header or can be further processed to produce a hydrogen product.

The embodiment of FIG. 1 is primarily designed to produce a syngas product with a hydrogen:carbon monoxide molar ratio of 1:1 but can readily be adapted to produce a different molar ratio, for example 2:1 for methanol synthesis. This syngas production is achieved by a simple and efficient means without auxiliary compression by conserving the low temperature refrigeration for heat exchanger E103, which would otherwise have to be provided by other means.

The hydrogen:carbon monoxide molar ratio of the syngas product 17 is determined primarily by the temperature in phase separator C103, which in turn is determined by the temperature in first phase separator pot C101. The temperature of the feed stream 2 at the outlet of heat exchanger E102 is an approach to the vaporizing temperature of the feed 23 to the methane column 24 and this is a function of the operating pressure of that column 24. Thus, the pressure of column 24 provides rough control of the hydrogen:carbon monoxide molar ratio of syngas product 17. Fine tuning of the syngas molar ratio is provided by controlling the amount, if any, of portion 15 of the carbon monoxide-enriched fourth liquid stream 14 and of portion 11 of the hydrogen-enriched third vapor stream 9.

Almost any hydrogen:carbon monoxide ratio in the syngas product 17 can be achieved over a wide range of feed compositions by controlling the amounts of portions 11 and 15 and the temperature of the fourth phase separator C103.

The following Table 1 summarizes the overall mass balance for a typical process of FIG. 1:

TABLE 1

| Stream Composition | Units | Feed (1) | CO Product (27) | Seal Losses | 1:1 Syngas (17) | Fuel Gas (32) |
|---|---|---|---|---|---|---|
| $H_2$ | mol % | 46.1 | 50 ppm | 50 ppm | 49.75 | 73.6 |
| $N_2$ | mol % | 0.3 | 0.4 | 0.4 | 0.3 | 0.2 |
| CO | mol % | 53.4 | 99.2 | 99.2 | 49.75 | 26.2 |
| AR | mol % | 0.2 | 0.4 | 0.4 | 0.2 | 0.03 |
| $CH_4$ | ppm | 100 | 5 | 5 | 50 | 350 |
| Flow | kgmol/h | 100 | 16 | 0.4 | 64.7 | 18.9 |
| Pressure | Barg | 60 | 45 | | 35 | 24 |
| | (MPag) | (6.0) | (4.5) | | (3.5) | (2.4) |
| Temperature | °C. | 27 | 38 | | 24 | 23 |
| CO Recovery | % | | | 90 | | |

Figure 2:
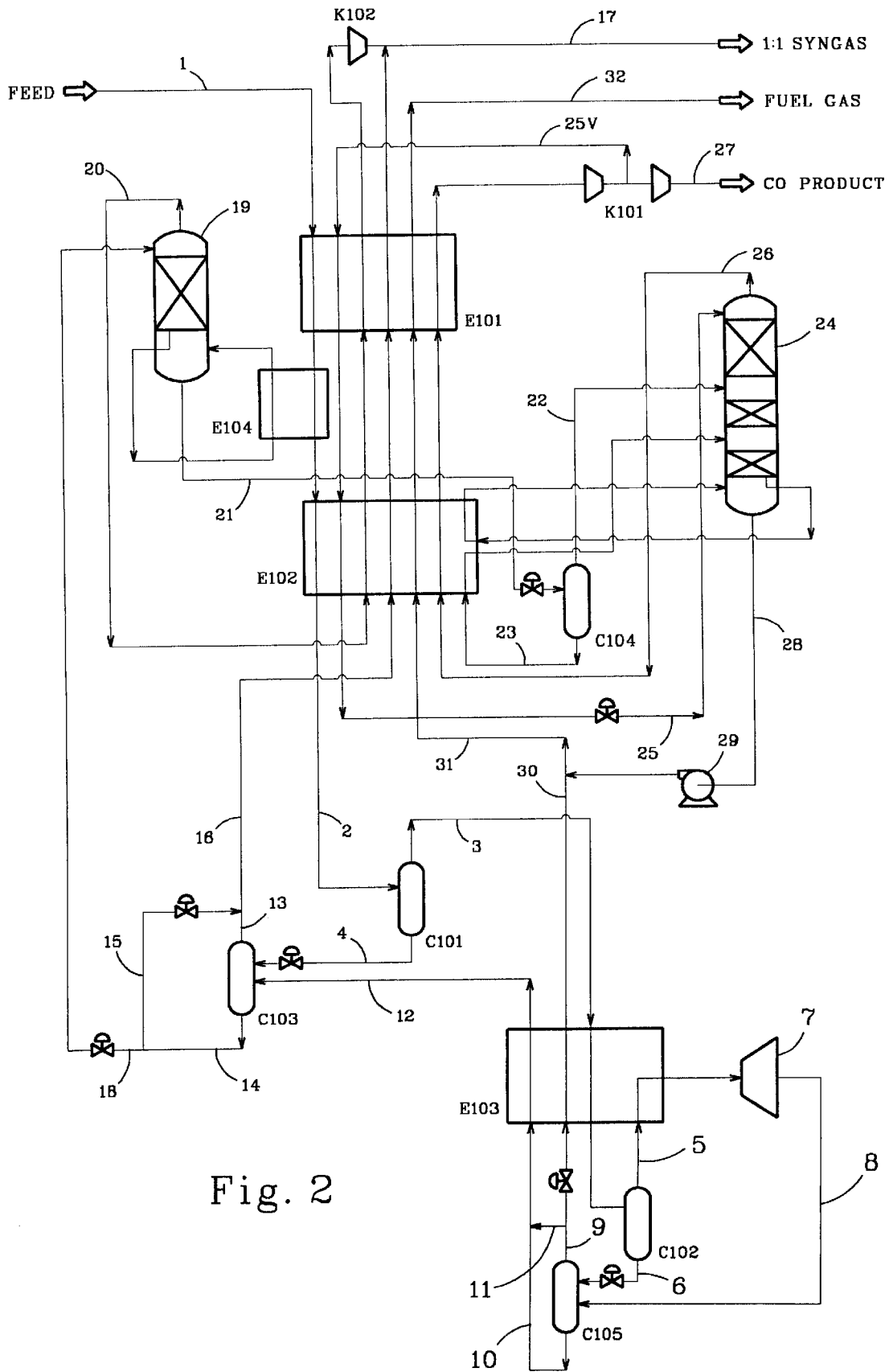
FIG. 2 is a schematic representation of a modification of the embodiment of FIG. 1 in which hydrogen-enriched gas separated from part of the feed mixture in a hydrogen stripping column is added to the gaseous product to increase the volume thereof at a hydrogen:carbon monoxide molar ratio of 1:1 in the combined product.

FIG. 2 illustrates a modification of the process of FIG. 1. The same or similar features of FIGS. 1 and 2 are identified by the same reference numerals and only the differences between the two processes will be described.

In the embodiment of FIG. 2, the warmed hydrogen column overhead 20 does not contribute to the fuel gas product 32 but is compressed in a compressor K102 and then combined with warmed vapor stream 16 to contribute to the syngas product 17.

Table 2 summarizes the overall mass balance of the embodiment of FIG. 2 for producing a syngas product having a hydrogen to carbon monoxide molar ratio of 1:1.

TABLE 2

| Stream | | Feed | CO Product | Seal | 1:1 Syngas | Fuel Gas |
|---|---|---|---|---|---|---|
| Composition | Units | (1) | (27) | Losses | (17) | (32) |
| $H_2$ | mol % | 46.1 | 50 ppm | 50 ppm | 49.75 | 91.1 |
| $N_2$ | mol % | 0.3 | 0.4 | 0.4 | 0.3 | 0.1 |
| CO | mol % | 53.4 | 99.2 | 99.2 | 49.75 | 8.8 |
| AR | mol % | 0.2 | 0.4 | 0.4 | 0.2 | 0.02 |
| $CH_4$ | ppm | 100 | 5 | 5 | 50 | 580 |
| Flow | kgmol/h | 100 | 16 | 0.4 | 72.7 | 10.9 |
| Pressure | Barg | 60 | 45 | | 35 | 24 |
| | (MPag) | (6.0) | (4.5) | | (3.5) | (2.4) |
| Temperature | °C. | 27 | 38 | | 25 | 24 |
| CO Recovery | % | | | 97.5 | | |

It will be noted that, for the same crude syngas feed and carbon monoxide product, the process of FIG. 2 provides commercially significantly (12.5%) increased syngas product flow and commercially significantly (7.5%) increased carbon monoxide recovery.

Control of the key elements of the processes exemplified above can allow the hydrogen:carbon monoxide ratio to be varied to achieve molar ratios above or below 1:1.

It will be appreciated that the invention is not restricted to the particular embodiments and modifications described above and that numerous modifications and variations can be made without departing from the scope of the invention as defined in the following claims.

What we claim is:

1. A process for changing the composition of a gaseous feed mixture containing hydrogen and carbon monoxide in a first molar ratio of hydrogen to carbon monoxide comprising the steps of:

partially condensing at least a portion of said gaseous feed mixture;

separating the partially condensed feed mixture by non-fractionating phase separation to provide a gaseous product stream, containing hydrogen and carbon monoxide at a different hydrogen:carbon monoxide molar ratio, and a carbon monoxide-rich process stream; and warming said gaseous product stream without further cryogenic separation thereof.

2. The process according to claim 1, wherein said partially condensed feed mixture is separated by first non-fractionating phase separation into a first liquid stream and a first vapor stream; said first vapor stream is partially condensed and separated by second non-fractionating phase separation into a second liquid stream and a second vapor stream; said carbon monoxide-rich process stream is at least partially derived from said first liquid stream; and said gaseous product stream is at least partially derived from at least one of said second liquid stream and said second vapor stream.

3. The process according to claim 2, wherein said second vapor stream is warmed and expanded to provide refrigeration; said expanded stream together with the second liquid stream is separated by third non-fractionating phase separation to provide a third liquid stream and a third vapor stream; and said gaseous product stream is at least partially derived from said third vapor stream.

4. The process according to claim 3, wherein said third liquid stream is mixed with a portion of said third vapor stream and partially vaporized to provide vaporized and non-vaporized portions; said gaseous product stream is at least partially derived from said vaporized portion; and said carbon monoxide-rich process stream is at least partially derived from said non-vaporized portion.

5. The process according to claim 4, wherein said vaporized and non-vaporized portions are separated by fourth non-fractionating phase separation to provide a fourth liquid stream and a fourth vapor stream; said gaseous product stream is at least partially derived from said fourth vapor stream; and said carbon monoxide-rich process stream is at least partially derived from said fourth liquid stream.

6. The process according to claim 5, wherein said first liquid stream is reduced in pressure and added to said vaporized and non-vaporized portions for said fourth phase separation.

7. The process according to claim 6, wherein a portion of said fourth liquid stream is added to said fourth vapor stream.

8. The process according to claim 7, wherein hydrogen is stripped from said carbon monoxide-rich process stream to provide a hydrogen-enriched vapor and a carbon monoxide-enriched liquid.

9. The process according to claim 4, wherein said liquid stream is mixed with a portion of said vapor stream and the mixture is completely vaporized to provide at least part of said gaseous product stream.

10. The process according to claim 2, wherein hydrogen is stripped from said carbon monoxide-rich process stream to provide a hydrogen-enriched vapor and a carbon monoxide-enriched liquid.

11. The process according to claim 10, wherein said hydrogen-enriched vapor is warmed and added to said warmed gaseous product stream.

12. The process according to claim 10, wherein said gaseous feed mixture contains methane and said carbon monoxide-enriched liquid is separated into a carbon monoxide-rich vapor stream and a methane-enriched liquid stream.

13. The process according to claim 12, wherein said carbon monoxide-rich vapor stream provides a recycle heat pump stream.

14. An apparatus for changing the composition of a gaseous feed mixture containing hydrogen and carbon monoxide in a first molar ratio of hydrogen to carbon monoxide, said apparatus comprising:

feed mixture heat exchange means for partially condensing at least a portion of said gaseous feed mixture;

non-fractionating phase separation means for separating the partially condensed feed mixture to provide a gaseous product stream, containing hydrogen and carbon monoxide at a different hydrogen:carbon monoxide molar ratio, and a carbon monoxide-rich process stream;

process stream conduit means for removing said carbon monoxide-rich process stream from said phase separation means;

product stream conduit means for removing said gaseous product stream from said phase separation means;

product stream heat exchange means connected to said product stream conduit means for receiving and warming said gaseous product stream without further cryogenic separation thereof.

15. The apparatus according to claim 14, wherein said phase separation means comprises:

a first non-fractionating phase separator for separating said partially condensed feed mixture into a first liquid stream and a first vapor stream;

first vapor stream heat exchange means for partially condensing said first vapor stream; and a second non-fractionating phase separator for separating said partially condensed first vapor stream into a second liquid stream and a second vapor stream; and wherein said process stream conduit means removes a carbon monoxide-rich process stream at least partially derived from said first liquid stream and said product stream conduit means removes a gaseous product stream at least partially derived from at least one of said second liquid stream and said second vapor stream.

16. The apparatus according to claim 15, wherein said phase separation means further comprises:

second vapor stream heat exchange means for warming said second vapor stream;

second vapor stream expansion means for expanding said warmed second vapor stream to provide refrigeration; and a third non-fractionating phase separator for separating said expanded stream to provide a third liquid stream and a third vapor stream; and wherein said product stream conduit means removes a gaseous product stream at least partially derived from said third vapor stream.

17. The apparatus according to claim 16, wherein said phase separation means further comprises:

second liquid stream pressure reduction means for reducing the pressure of said second liquid stream and second liquid stream conduit means for adding said reduced pressure stream to said third phase separator.

18. The apparatus according to claim 16, wherein said phase separation means further comprises third vapor stream conduit means for mixing a portion of said third vapor stream with said third liquid stream and third liquid stream heat exchange means for partially vaporizing said mixture of third liquid and vapor streams; said product stream conduit means removes a gaseous product stream at least partially derived from the vaporized portion of said partially vaporized mixture of third liquid and vapor streams; and said process stream conduit means removes a carbon monoxide-rich process stream at least partially derived from the non-vaporized portion of said partially vaporizing mixture of third liquid and vapor streams.

19. The apparatus according to claim 18, wherein said phase separation means further comprises a fourth non-fractionating phase separator to provide a fourth liquid stream and a fourth vapor stream from said partially vaporized mixture of third liquid and vapor streams; said product stream conduit means removes a gaseous product stream at least partially derived from said fourth vapor stream; and said process stream conduit means removes a carbon monoxide-rich process stream at least partially derived from said fourth liquid stream.

20. The apparatus according to claim 19, wherein said phase separation means further comprises first liquid stream pressure reduction means for reducing the pressure of said first liquid stream and first liquid stream conduit means for adding said reduced pressure stream to said fourth phase separator.

21. The apparatus according to claim 20, wherein said phase separation means further comprises fourth liquid stream conduit means for adding a portion of the fourth liquid stream to said fourth vapor stream.

22. The apparatus according to claim 21, further comprising hydrogen separation means for stripping hydrogen from said carbon monoxide-rich process stream to provide a hydrogen-enriched vapor and a carbon monoxide-enriched liquid.

23. The apparatus according to claim 16, wherein said phase separation means further comprises third vapor stream conduit means for mixing a portion of said third vapor stream with said third liquid stream and third liquid stream heat exchange means for completely vaporizing said mixture of third liquid and vapor streams to provide at least part of said gaseous product stream.

24. The apparatus according to claim 14, further comprising hydrogen separation means for stripping hydrogen from said carbon monoxide-rich process stream to provide a hydrogen-enriched vapor and a carbon monoxide-enriched liquid.

25. The apparatus according to claim 24, further comprising hydrogen-enriched vapor heat exchange means for warming said hydrogen-enriched vapor and hydrogen-enriched vapor conduit means for adding said warmed vapor to said warmed gaseous product stream.

26. The apparatus according to claim 24, further comprising methane separation means for separating said carbon monoxide-enriched liquid into a carbon monoxide-rich vapor stream and a methane-enriched liquid stream.

27. The apparatus according to claim 26, including heat pump means for circulating a heat pump stream derived from said carbon monoxide-rich vapor stream.

* * * * *